Aug. 24, 1948.  P. G. COX  2,447,797
EDGE FILTER
Filed April 22, 1943
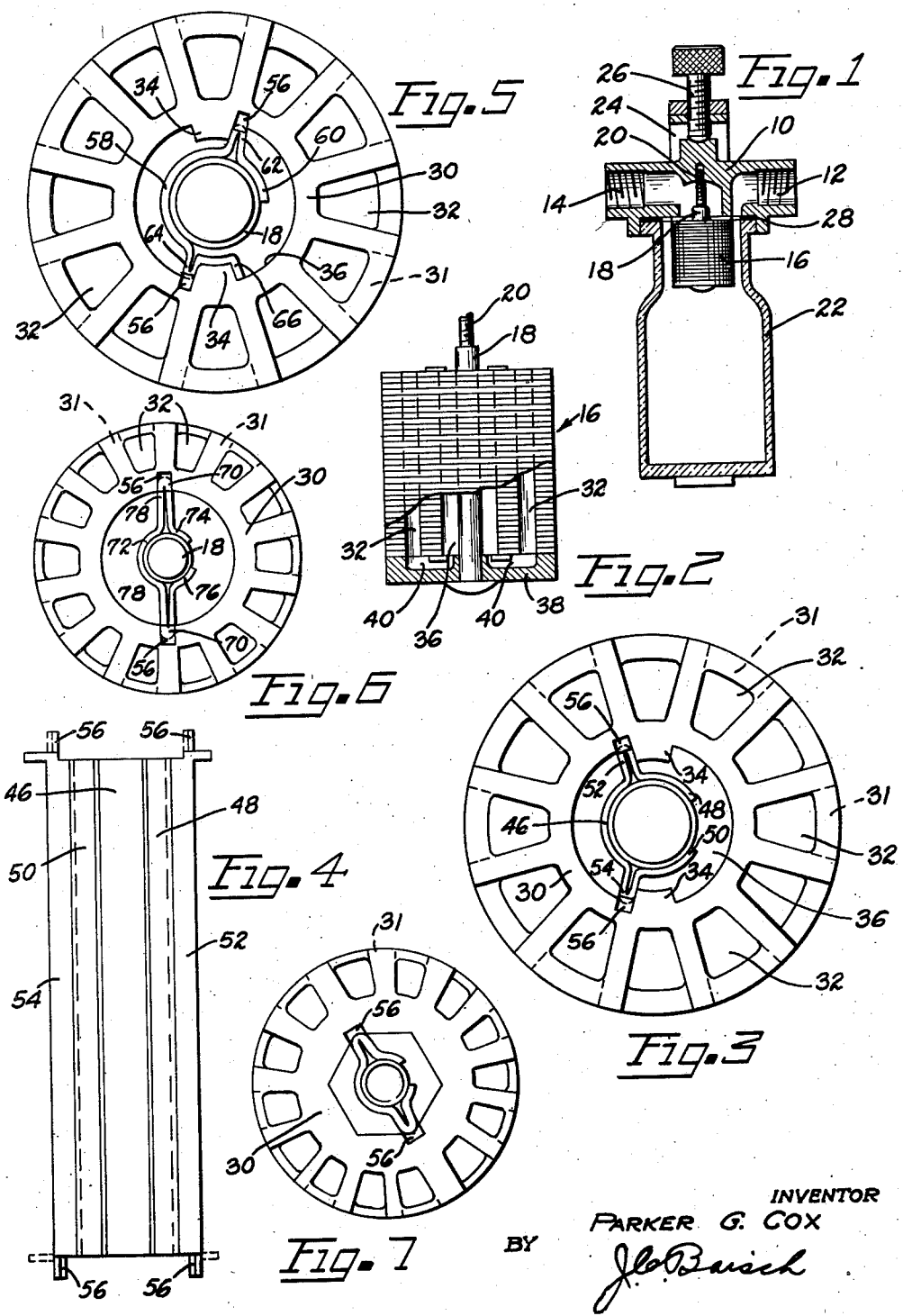
INVENTOR
PARKER G. COX
BY
J. C. Barsch Patented Aug. 24, 1948

2,447,797

UNITED STATES PATENT OFFICE 2,447,797

EDGE FILTER

Parker G. Cox, Detroit, Mich., assignor to Bendix Aviation Corporation, South Bend, Ind., a corporation of Delaware Application April 22, 1943, Serial No. 483,987

7 Claims. (Cl. 210—165)

This invention relates generally to filters for filtering fluids and particularly to edge type filters.

The stacks of edge type filter elements are generally laminary in character and formed of thin washers having circumferentially arranged holes punched therethrough. The washers are arranged in the stack so that the holes therein are registered to form longitudinal outer channels substantially parallel to the axis of the stack and circumferentially spaced from each other.

The washers may be of various known patterns and may be variously arranged in the stack to provide narrow filtering passages between the outside of the stack and the channels. Generally the filter element has an axial stem on which the washers are stacked, there being means provided for holding them in registration on the stem. The latter has a threaded end for securing the stack to the head of the filter and one end of the stack is urged against the head, the other end of said stack being free.

The fluid to be filtered usually enters the stack from the periphery thereof and passes through the narrow filtering passages into the channels.

In such filters the fluid entering the stack at one side of the longitudinal center thereof tends to flow in the channels toward the adjacent end of the stack and the fluid entering at the other side of said longitudinal center tends to flow in the channels toward the opposite end of the stack. Therefore in order to obtain full effectiveness, efficiency and capacity of the filter stack a central or axial passage is provided therein and a plate is provided for the free end of the stack which has a passage or recess adapted to permit the flow of fluid between the channels and the central or axial passage.

With such an arrangement the stem must be of smaller diameter than the passage in order to permit fluid to flow through said central passage. However in a device of this character difficulty is encountered in providing suitable means for securing the stack on the stem so that said stack will be held in fixed relation thereto and will not tilt thereon.

It is therefore an important object of the invention to provide a device of this character having simple, effective, and inexpensive means for attaching the stack to the stem and it is still another object of the invention to provide such a device that will retain the washers in the stack with the holes thereof in registration throughout the stack to form the channels as well as central passage.

It is still another object of the invention to provide a device of this character having means for preventing the washers from becoming disassembled.

A further object is to provide a device of this character that is simple in construction and operation and inexpensive to manufacture.

Other objects and advantages of the invention will become apparent from the following description taken in connection with the accompanying drawings, in which:

Figure 1 is a vertical section through an assembled filtering device.

Figure 2 is an enlarged side elevation of a filter embodying a preferred form of the invention; portions of the element being broken away;

Figure 3 is an enlarged plan view of the filter element shown in Figure 2;

Figure 4 is a side elevation of the retaining member shown in Figure 3;

Figure 5 is an enlarged plan view of a filter element embodying a modification of the invention; and Figures 6 and 7 are plan views of filter elements wherein the central openings in the washers are modified and said washers are stacked on a modified retaining member.

While preferred embodiments of the invention are shown in the accompanying drawings and herein described in detail it is to be understood that this disclosure is given for the purpose of illustrating the invention and is not intended as a limitation thereof to the constructions disclosed.

Throughout the drawings similar reference characters represent similar parts although where said parts are modified in structure and operation they are given a further differing reference character.

Referring more particularly to Figure 1 the filtering device is shown as including a head 10, an inlet passage 12 therein, and an outlet passage 14. A filter element 16 is interposed between said passages and includes a stem 18 having a reduced threaded portion 20 which is screwed into the head 10 for attachment of the element to the head. A receptacle 22, which may be of transparent material, connects the inlet and outlet passages and is secured to the head by a clamp 24 having a screw 26 for tightening said clamp, gasket 28 being provided between the receptacle and the head to provide a seal therebetween.

Referring to Figures 2, 3 and 4 the filter element is shown as including a filter stack comprising a plurality of thin washers each having a hub portion 30 from which radiate annularly spaced leaf-like portions or lobes 31 with apertures punched therein and registered throughout the stack to form longitudinally extending outer channels 32 which are annularly spaced apart. These washers are arranged so that the lobes of one washer are in register with the spaces between the lobes of the immediately adjacent washers thus providing filtering passages between the exterior of the stack and the channels 32. Other well known types of washers may be used in the stack such as are shown, for example, in the patents to V. R. Heftler, Nos. 1,641,485 and 1,694,939. Still other types of washer patterns and washer arrangements may also be used.

Each washer in the present device is provided with a relatively large central opening in the hub portion 30, and lugs 34 which project inwardly of said opening from said hub, said lugs 34 preferably being diametrically opposed although they may be otherwise arranged. When the washers are stacked the central openings form a large central or axial passage 36 and the lugs form longitudinally extending inwardly projecting ridges.

At the free end or lower end of the stack, as shown in the drawings, an end plate 38 is provided which has a recess or passage 40 connecting the channels 32 with the central passage 36. With this arrangement fluid entering the stack adjacent the lower end thereof enters channels 32, passes downwardly therein, with reference to the drawings, into the passage 40 and upwardly through the central passage 36 leaving the device by way of the outlet passage 14 in the head 16. Fluid entering the stack adjacent the upper end thereof enters the channels 32 and flows upwardly and also leaves the device by way of the outlet passage 14 in the head.

The retaining member is shown as being formed of a sheet of metal or any other suitable material and includes an arcuate body comprising sections 46, 48 and 50 which extend far enough about the stem 18 to securely engage same. The retaining member also includes outwardly extending flanges 52 and 54 which are adapted to be confined between adjacent sides of the lugs and to be received in the groove-like angular portion or corners at the juncture of the lugs 34 with the hubs 30. Thus the washers are retained against rotational movement to maintain the registration of the respective apertures, lugs and central openings throughout the stack. If desired each end of the flanges 52 and 54 may be provided with an ear 56 adapted to be turned over into overlapping relation with respect to the adjacent end washers of the stack thereby preventing disassembly of the stack. In some instances it may be desirable to have the retaining member of substantially the same length as the stack of washers so that the overturned ears 56 will hold the washers against any longitudinal movement relative to each other. In other cases it may be preferable to have the retaining member somewhat longer, a quarter of an inch or any other suitable amount, than the length of the stack. In the latter case the ears 56 prevent the washers from becoming disassembled but allows them to separate sufficiently for cleaning of the filter stack.

It will be noted that the retaining member is adapted to hold the stack against tilting on the stem in which connection it may be pointed out that the material from which said retaining member is formed may, if desired, be resilient and the body sections 46, 48 and 50 may be so arranged that said member will resiliently engage the stem. It should also be noted that if it is desired not to include the ears 56, the elements may be held against longitudinal displacement, when the stack is attached to the head, by the plate 38 and the adjacent end of the filter head.

Referring to Figure 5 the retaining member is formed with a main body portion 58 and a second body portion 60 which engage the stem 18. Oppositely disposed radial flanges 62 and 64 are located adjacent corresponding sides of the lugs 34 in the angles at the bases thereof and the retaining member adjacent one of the flanges 62 and 64 is formed into a channel-shaped portion 66 in which the adjacent lugs 34 are snugly received thus preventing rotational displacement of the washers in the stack. Ears 56 are also provided in this embodiment of the invention to prevent longitudinal displacement of the washers.

A further modification of the invention is shown in Figures 6 and 7 and is adapted for use in connection with filter stacks wherein the central opening in the washers is modified. In Figure 6 the central opening in the washers is substantially circular with oppositely disposed notches 70 in the hub 30. The retaining member comprises a body portion including arcuate sections 72, 74 and 76 which together extend a substantial distance about the stem 18 and engage said stem. Flanges 78 extend radially from the body portion and are received in the notches 70. There is an ear 56 at each end of each flange and said ears are adapted to be turned over to retain the stacked washers against longitudinal displacement, as in the other modifications of the invention.

In Figure 7 the same retaining member is shown as is disclosed in Figure 6. However the central opening in the washers is hexagonal with the flanges of the retaining member fitting into opposite corners of said opening. It is to be understood of course that the retaining member is adapted to be used in connection with washers wherein the shape of the central opening is square or octagonal or of any other shape which will similarly permit the stacking of the washers thereon.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the forms hereinbefore described including merely preferred embodiments thereof.

I claim:

1. In an edge type filtering element, a plurality of stacked washers each having a relatively large central aperture, the central apertures of the washers which make up the stack being in register to provide a central passage extending through the stack, lugs on said washers projecting into the passage, a stem received in said passage adapted to support the element, and a retaining member for said washeres having a portion adapted to be removably clipped on the stem, said portion being provided with flanges extending longitudinally of the stack and adapted to engage the lugs of the washers and hold the latter against rotation relative to each other, said retaining member being adapted to secure the stack of washers in substantial axial relationship relative to the stem.

2. The invention defined in claim 1 wherein the flanges are provided with ears adjacent the ends thereof adapted to be turned over to engage the respective ends of the stack.

3. In an edge type filtering element, a plurality of stacked washers each having a hub portion provided with a central aperture and a lug projecting inwardly of the aperture, said apertures and lugs being in registration throughout the stack providing a central passage through the stack and a ridge extending along and projecting inwardly of said passage, a supporting stem for said stack extending through the passage and of smaller cross sectional area than said passage, and a retaining member for said washers having an elongated hollow body portion clipped on and frictionally engaging the stem and means projecting radially from said body portion defining a channel adapted to receive the lugs of the washers and align the latter.

4. In a filter, a receptacle, a head or fitting removably mounted on said receptacle and provided with an inlet passage and an outlet passage communicating with one another through the receptacle, an edge type filter element supported from said head and extending into said receptacle, said filter element comprising a plurality of stacked washers, one end of said stack engaging the filter head in a manner such as to cause fluid to be filtered to pass through the stack before flowing into the outlet passage, said stack having a central passage communicating at one end with the outlet passage in the head, a stem extending through the central passage of the stack for securing the stack to said head, said stem being smaller in diameter than said central passage, and an elongated retaining and aligning member for said washers comprising a hollow body formed of resilient material and constructed in a manner such that it may be releasably connected to said stem, said washers and body being provided with interengaging aligned recesses and projections for holding the washers of the stack in alignment and against rotation with respect to one another.

5. In an edge type filter element, a plurality of stacked washers having perforations therein, said washers being disposed in alignment so that the respective perforations are in registration throughout the stack to form a plurality of longitudinal passages through the stack, a stem extending through one of said passages for supporting the stack, said stem being of smaller cross sectional area than the passage through which it extends, and a retaining member for said washers having an elongated hollow resilient body portion adapted to be clipped on to the stem and provided with means for engaging the washers and maintain the latter in alignment, said retaining member being also provided with ears at the opposite ends thereof functioning to hold the washers of the stack within a predetermined space longitudinally of the stack, the space between the ears longitudinally of the retaining member being slightly greater than the normal length of the stack to permit limited separation of the washers for cleaning purposes.

6. In a filter element having laminated walls through which fluid is adapted to pass to be filtered, fluid passages for filtered fluid defined by perforations formed in the laminae of said walls including a central passage having opposed side walls formed with longitudinally extending recesses, a stem extending through said central passage and spaced from the walls thereof to permit filtered fluid to flow through said latter passage, and means for retaining the laminae of the filter element in fixed filtering relation including an elongated hollow body member adapted to resiliently engage the stem along the major portion of the length thereof and flanges extending laterally from said member and adapted to engage the recesses formed in the walls of said central passage.

7. The invention defined by claim 6 wherein the central passage is polygonal shaped in cross section and the interior angles of the polygon define elongated opposed recesses in which the respective flanges of said retaining member are received.

PARKER G. COX.

REFERENCES CITED

The following references are of record in the file of this patent:

UNITED STATES PATENTS

| Number | Name | Date |
| --- | --- | --- |
| 1,641,485 | Heftler | Sept. 6, 1927 |
| 1,677,892 | Herbert et al. | July 24, 1928 |
| 1,768,350 | Chase | June 24, 1930 |
| 1,771,928 | Jung | July 29, 1930 |
| 1,793,583 | Bowden | Feb. 24, 1931 |
| 1,849,582 | Lundborg | Mar. 15, 1932 |
| 1,976,547 | Dumas | Oct. 9, 1934 |
| 1,977,174 | Crawford | Oct. 16, 1934 |
| 2,063,742 | Holmes | Dec. 8, 1936 |
| 2,126,938 | Williams et al. | Aug. 16, 1938 |
| 2,159,196 | Babitch | May 23, 1939 |
| 2,260,899 | Heftler | Oct. 28, 1941 |
| 2,284,787 | Winkler | June 2, 1942 |
| 2,354,380 | Kasten | July 25, 1944 |